United States Patent

Terada et al.

Patent Number: 6,040,554
Date of Patent: Mar. 21, 2000

[54] WELDING ROBOT CONTROL SYSTEM

[75] Inventors: Akihiro Terada, Fujiyoshida; Mitsuhiro Okuda, Oshino-mura, both of Japan

[73] Assignee: Fanuc Ltd, Yamanashi, Japan

[21] Appl. No.: 09/043,487

[22] PCT Filed: Jul. 22, 1997

[86] PCT No.: PCT/JP97/02532

§ 371 Date: Mar. 19, 1998

§ 102(e) Date: Mar. 19, 1998

[87] PCT Pub. No.: WO98/03294

PCT Pub. Date: Jan. 29, 1998

[30] Foreign Application Priority Data

Jul. 19, 1996 [JP] Japan .................................. 8-207641

[51] Int. Cl.⁷ .................................................. B23K 9/127
[52] U.S. Cl. ........................................ 219/124.34; 901/42
[58] Field of Search ........................... 219/124.34, 125.1, 219/125.11; 901/42; 364/571.01

[56] References Cited

U.S. PATENT DOCUMENTS

| | | | |
|---|---|---|---|
| 4,636,612 | 1/1987 | Cullen | 219/124.34 |
| 5,511,007 | 4/1996 | Nihei et al. | 364/571.01 |

FOREIGN PATENT DOCUMENTS

| | | |
|---|---|---|
| 61-191905 | 8/1986 | Japan . |
| 3-161173 | 7/1991 | Japan . |
| 4-258379 | 9/1992 | Japan . |
| 8-39470 | 2/1996 | Japan . |

Primary Examiner—Clifford C. Shaw
Attorney, Agent, or Firm—Staas & Halsey

[57] ABSTRACT

A control system of a welding robot for performing realtime tracking using a laser sensor in which a welding operation in passing a tack welded portion is rationally coped with. An arc welding torch and a laser sensor LS are mounted on a robot hand. A tool center point is set to coincide with an aimed position of a distal end of a welding wire. The tool center point is positioned at an advancing end of a formed bead B and immediately before a tack welded portion A1. The tool center point 4 is also positioned on a welding reference line ($P_1 \to \ldots \to P_6$). A bright line 5 is formed between points 51 and 52 by a laser beam emitted from the laser sensor LS with a deflection range SC. A detected point SA is positioned at an edge of the tack welded portion A1 on the bright line 5 (there may be found no detected point). A deviation of the detected point SA from the proper welding reference line is determined based on a direction of a robot path immediately before the detected point. In such case, a detection substitutive point Q is determined based on the robot path immediately before the detected point and the TCP is moved toward the determined point. Detection substitutive points following the point Q are successively determined until the tack welded portion A1 has been passed, and the robot follows a path along a series of the detection substitutive points.

6 Claims, 8 Drawing Sheets

WELDING ROBOT CONTROL SYSTEM

TECHNICAL FIELD

The present invention relates to a control system for a welding robot. More particularly, the present invention relates to a control system capable of properly defining a movement path when the welding robot for performing realtime tracking using a laser sensor passes a tack welding portion.

BACKGROUND ART

There is widely known a robot movement path control technique, as a realtime tracking technique using a laser sensor, in which the robot movement path is controlled by correcting a taught path according to the detection results of the laser sensor mounted on a robot hand for previously sensing the forward region in the advancing direction of the robot from moment to moment during a playback operation.

The realtime tracking technique using the laser sensor enables the robot to trace a proper movement path even in the case where individual workpieces are inaccurately positioned, and thus provides an extremely useful technical means for industrial robots for performing a variety of tasks.

Figure 1:
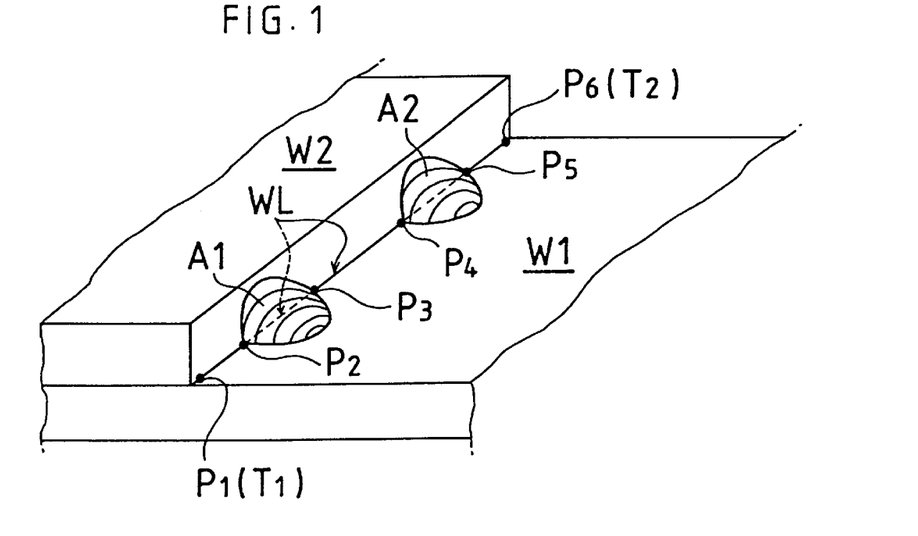
FIG. 1 is a perspective view showing a fillet weld joint having tack welded portions.
Figure 2A:
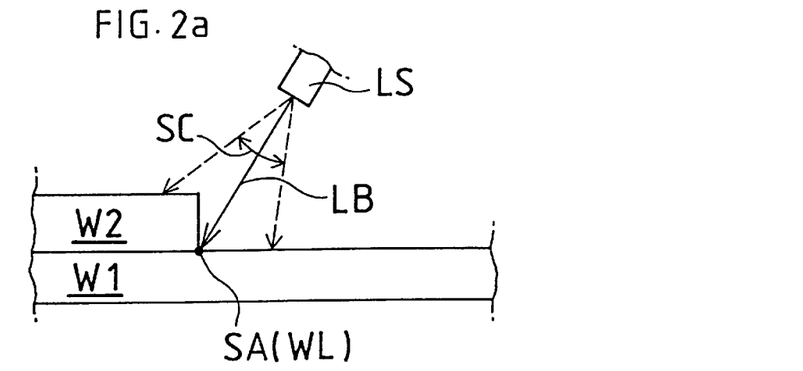
FIG. 2a is a sectional view showing a position of a detected point by a laser sensor on a welding corner line of the fillet weld joint in a section where a tack welded portion does not exist, as shown in FIG. 1.
Figure 2B:
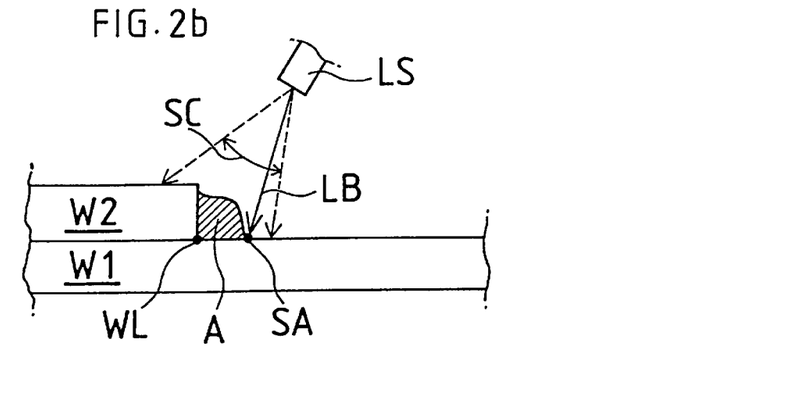
FIG. 2b is a sectional view showing a position of a detected point by the laser sensor on the welding corner line in a section where a tack welded portion exists.

However, when applying this technique to a welding robot for arc welding, there arises a problem of how to deal with a so-called tack welded portion. FIGS. 1, 2a and 2b illustrate this problem, wherein FIG. 1 shows an external appearance of a fillet weld joint having tack welded portions, FIG. 2a is a sectional view showing a position of a detected point by a laser sensor on a welding corner line of the fillet weld joint in a section without tack welded portion as shown in FIG. 1, and FIG. 2b is a sectional view showing a position of a detected point by the laser sensor on the welding corner line in a section with the tack welded portion. It is to be noted that a term "welding reference line" used in the following description denotes a line connecting reference points at which the welding is aimed (each reference point being a point to which a distal end of a welding wire is to be brought).

In FIGS. 1, 2a and 2b, symbols W1 and W2 represent two platelike workpieces forming a joint, and the welding is performed on a corner line formed between the two workpieces W1 and W2. Points $P_1, P_2, \ldots, P_6$ represent welding sections, wherein $P_1$ is a welding start point (near a taught point $T_1$) and $P_6$ is a welding end point (near a taught point $T_2$). In this example, a welding reference line WL forms a substantially straight path (not necessarily straight in the strict sense) indicated by $P_1 \rightarrow P_2 \rightarrow \ldots \rightarrow P_6$.

A path of movement of the distal end point of a tool of the welding robot is desired to be coincide with the welding reference line WL (no shift for adjustment) or a line obtained by shifting the welding reference line by a predetermined amount for adjustment (e.g., a path spaced by 2 mm in the vertical or horizontal direction from the corner line).

In the case where some tack welded portions, such as A1 and A2 in FIG. 1, exist along the welding reference line WL, however, the corner line (the welding reference line WL) are covered and concealed with the tack welds in a section $P_2$–$P_3$ and a section $P_4$–$P_5$, and thus the position of the welding reference line WL cannot be detected by the laser sensor, making it difficult to define the desired path as mentioned above.

In other words, when scanning the corner line transversely with a laser beam LB from the laser sensor LS (with a deflection range SC) so as to detect the position of the corner line (the position of the welding reference line WL) as shown in FIG. 2a, a detected point SA on the corner line can be obtained in the sections ($P_1$–$P_2$, $P_3$–$P_4$, $P_5$–$P_6$) where no tack welded portion exists. However, in the sections (2–$P_3$, $P_4$–$P_5$) where the tack welded portions exist, the detected point SA is obtained near an edge of the tack welded portion A, and thus is deviated from the position of the corner line (the welding reference line WL), as shown in FIG. 2b. This causes the robot path to be deflected laterally and deviated from the aforementioned desired path.

Further, depending on the shape or size of the tack welded portion A, there is found no detected point (detection failure) or the position of the detected point is disordered (erroneous detection). If such detection failure or erroneous detection occurs during an actual welding operation, the robot strays or suddenly stops in the vicinity of the tack welded portion to impede the welding operation.

SUMMARY OF THE INVENTION

An object of the present invention is to solve the aforementioned problems with which the conventional system is confronted when a tack welded portion exists on a welding path. That is, the object of the present invention is to provide a control system for an arc welding robot having a realtime tracking function with a laser sensor, in which a movement path can be properly defined even while passing a tack welded portion on the welding path. The present invention is therefore intended to enlarge applicability of the realtime tracking function using the laser sensor and to enhance the efficiency and quality of the welding operation by the arc welding robot.

A welding robot control system of the present invention is designed for controlling the welding robot for performing the arc welding by moving a welding torch mounted on a robot hand along the welding reference line. The system comprises: a laser sensor mounted on the robot hand, for repeatedly detecting a characteristic point of a joint shape of workpieces by scanning a region in an advancing direction of the welding robot with a laser beam; and properness determining means for determining whether the detected characteristic point is proper or improper as a point representing a position of the welding reference line, when the characterizing point is detected by the laser sensor. An encounter with and a departure from a tack welded portion is determined by the properness determining means on a realtime basis.

The system of the present invention further comprises: first storing means for storing data representing the position of the detected point as data of a welding reference line representative point when the detected characteristic point is determined to be improper by the properness determining means; detection substitutive point determining means for determining a detection substitutive point to be substituted for the detected characteristic point when it is determined that the detected characteristic point is improper by the properness determining means and when the characteristic point is not detected by the laser sensor; and second storing means for storing data representing a position of the detection substitutive point as data of the welding reference line representative point. With the above arrangement, the data of the welding reference line representative points which properly represent the welding reference line are stored in advance of the robot movement in a movement section with no tack welded portion and also a movement section with the tack welded portion.

In the system, by treating the data of the welding reference line representative points as the data of the detected points in the ordinary realtime tracking, target points of movement can be successively determined so as to conform to a desired movement path in the section with the tack welded portion and also the section with no tack welded portion.

It is preferable that the properness determining means comprises: means for obtaining a deviation index value which represents a magnitude of deviation of the detected characteristic point from the position of the welding reference line based on the data of the welding reference line representative points stored in near past in the first and second storing means and the data representing the position of the detected characteristic point; and means for comparing the deviation index value with a reference value.

It is preferable that the detection substitutive point determining means includes means for determining the detection substitutive point on an extended line of the welding reference line represented by the data of the welding reference line representative points stored in near past. In this case, it is appropriate that the extended line of the welding reference line is defined as a straight line or a circular arc depending on whether the taught path extends on a straight line or a circular arc.

BEST MODE OF CARRYING OUT THE INVENTION

A laser sensor usable in the present invention will be explained first. Since general arrangement and function of the laser sensor are already known in the art, only an outline thereof will be described below.

Figure 3:
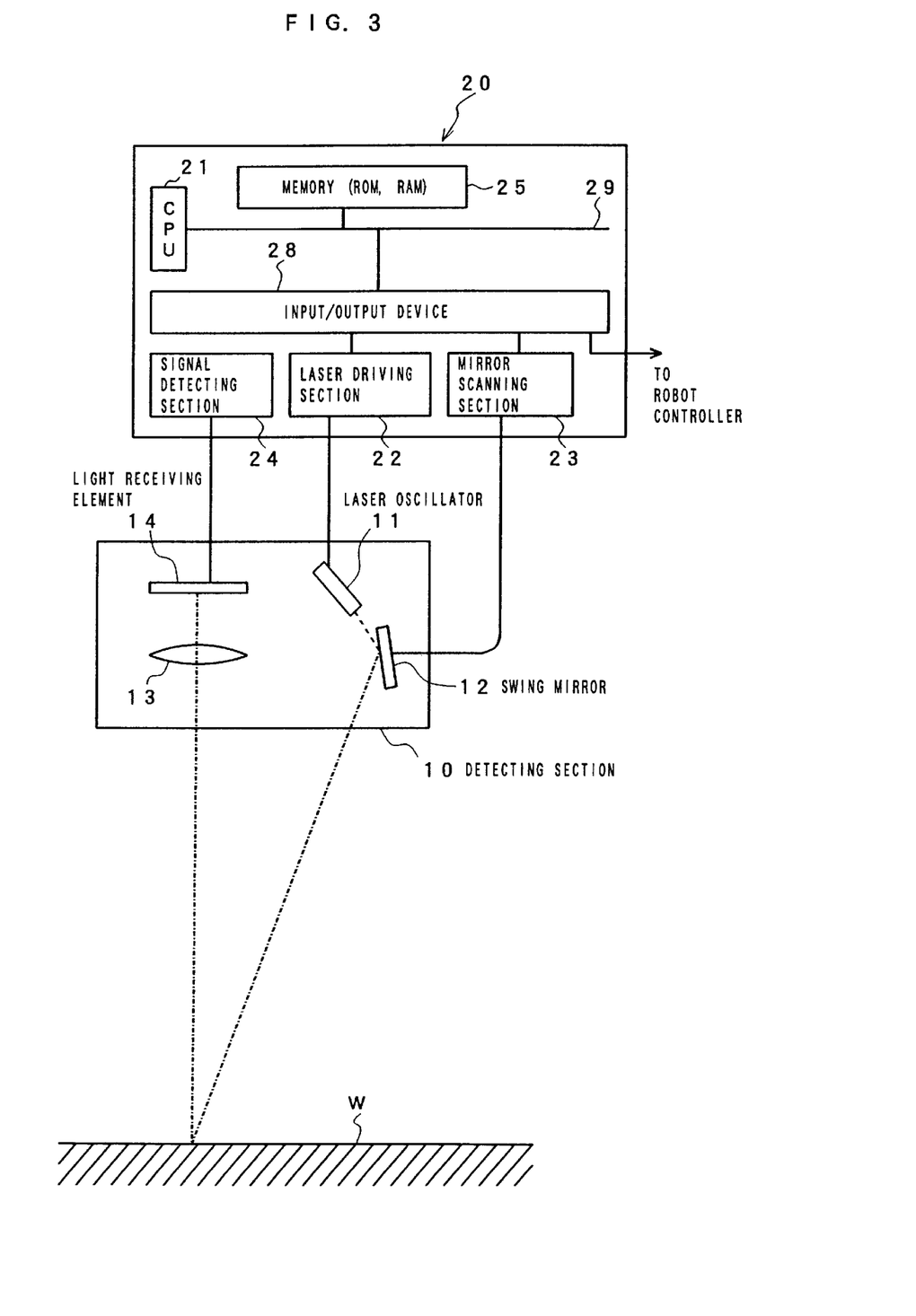
FIG. 3 is a block diagram showing a principal part of a laser sensor for use in the present invention.

FIG. 3 exemplifies an arrangement of a principal part of a laser sensor usable in the present invention by a block diagram. In the figure, reference numeral 10 generally denotes a detecting section which comprises a laser oscillator 11, a swing mirror (galvanometer) 12 for making a laser beam scan, and an optical system 13 for receiving reflected light and forming an image on a light receiving element 14.

A control section 20, which constitutes a sensor board, comprises a CPU 21 in the form of a microprocessor, to which an input/output device 28 and a memory 25 in the form of ROM and RAM are connected via a bus 29. A laser driving section 22 for driving the laser oscillator 11 to generate a laser beam, a mirror scanning section 23 for swinging the swing mirror 12, and a signal detecting section 24 for position detection based on a position of light reception in the light receiving device 14 are connected to the input/output device 28. The input/output device 28 is also connected to a line for exchanging various commands and data with a robot controller 40 (see FIG. 5).

On receiving a laser sensor start command from the robot controller 40, a laser sensor driving program stored in the memory 25 is started, and the CPU 21 sends a laser driving command to the laser driving section 22 so that the laser oscillator 11 is driven to generate a laser beam, and also sends a mirror scanning command to the mirror scanning section 23 to cause the swing mirror 12 to make a swinging motion, whereby the laser beam generated by the laser oscillator 11 is projected onto an object W for scanning.

The laser beam, having been subjected to diffuse reflection on the object W, forms an image, dependent on the position of reflection on the object on the light receiving device 14 with the aid of the optical system 13. For the light receiving device, a CCD (Charge Coupled Device), which is a split-type device, or a PSD (Position Sensitive Detector), which is a non-split, integration-type device, and the like may be used.

In this embodiment, a one-dimensional CCD array of the laser sensor is used as the light receiving device 14. The light (image of the reflected light) falling on the light receiving surface of the light receiving device 14 is converted into photoelectrons, and stored in its cells. In response to a CCD scanning signal from the signal detecting section 24, the charges stored in the cells are output sequentially from one end of the array at a predetermined period, and by way of the signal detecting section 24 and the input/output device 28, undergoes processing AD conversion and the like so that the updated data is stored in the memory 25.

The scanning period of the CCD is set to a period sufficiently shorter than that of the swing mirror 12 (e.g., 1/several hundreds), and a change in the angle of the swing mirror 12 and a change in the output state of the CCD are recognizable at any desired time. The output state of the CCD is recognized as the position of a cell (cell number) giving the largest output of all, and thus the position of a cell upon which the reflected light impinges is detected. Based on this position, the position of the object W relative to the sensor is calculated.

Figure 4:
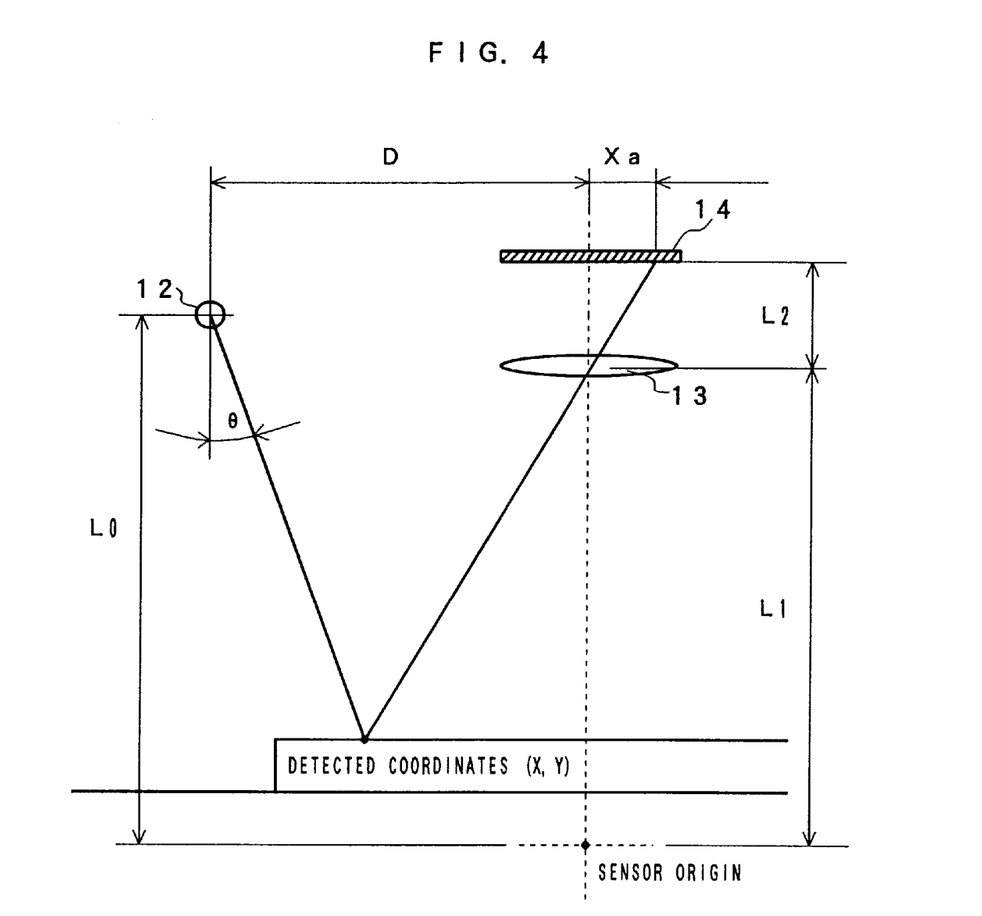
FIG. 4 is a diagram showing the principle of obtaining coordinates of a position of an object relative to the sensor based on the position detected by a light receiving device.

FIG. 4 is a diagram illustrating the principle of obtaining coordinates (X, Y) of the position of the object W relative to the sensor, based on a position xa detected by the light receiving device 14. Here, it is assumed that a sensor origin (0, 0) is located on a line connecting the center of the optical system and the center point of the light receiving device 14. It is also assumed that the Y axis coincides with the line connecting the center of the optical system and the center point of the light receiving device 14, and that the X axis extends perpendicularly to the Y-axis.

The distance from the origin to the center of the optical system is L1; the distance from the center of the optical system to the center point of the light receiving device 14 is L2; the distance from the sensor origin to the center of rocking motion of the swing mirror 12 in the X-axis direction is D; the distance from the sensor origin to the center of rocking motion of the swing mirror along the Y axis is L0; the angle between reflected light of the laser beam reflected by the swing mirror 12 and the Y-axis is θ; and the position of light reception on the light receiving device 14 is xa. Under these conditions, coordinates (X, Y) of the position at which the laser beam falls upon the object and is reflected thereby can be obtained by calculation according to the equations below.

$$X = xa \cdot [(L1-L0) \cdot \tan\theta + D]/(xa + L2 \cdot \tan\theta) \quad (1)$$

$$Y = [L1 \cdot xa + L2 \cdot (L0 \cdot \tan\theta - D)]/(xa + L2 \cdot \tan\theta) \quad (2)$$

Figure 5:
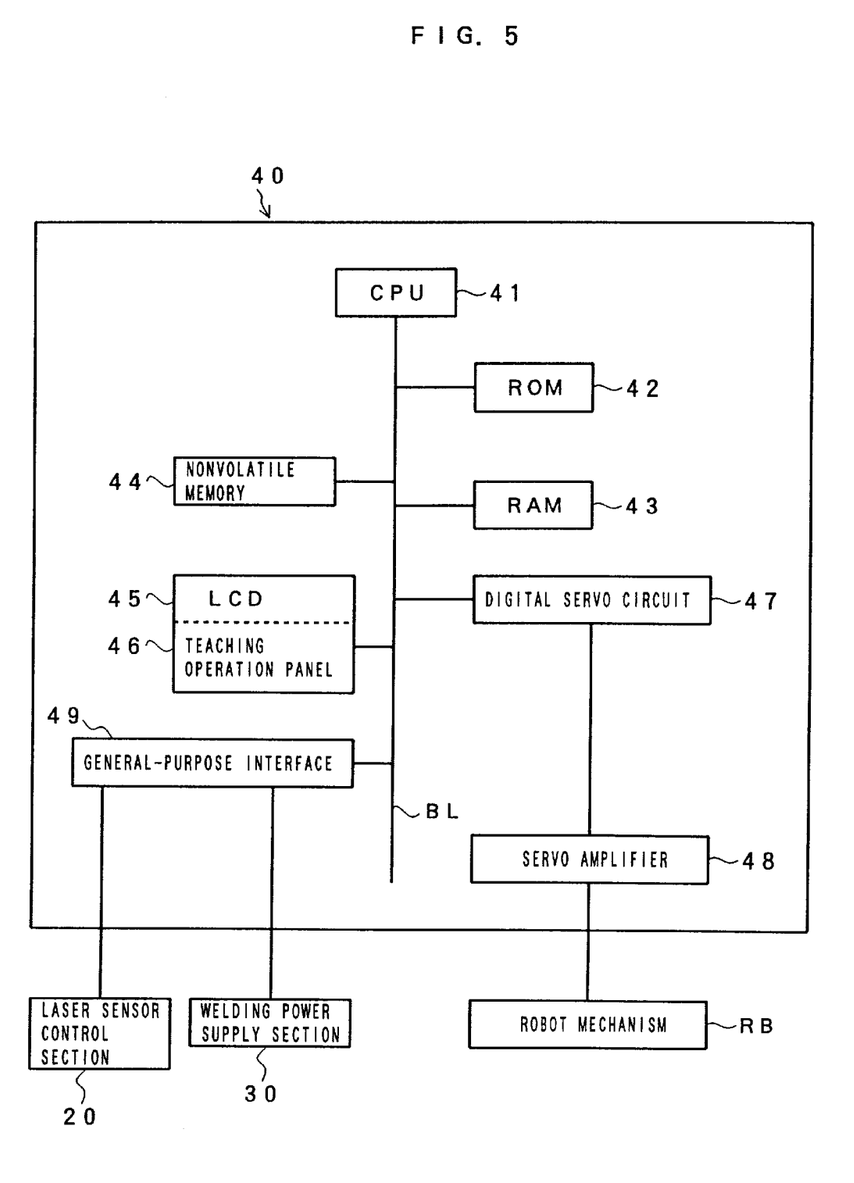
FIG. 5 is a block diagram showing a principal part of a system used in an embodiment.

Referring now to FIG. 5, an arrangement of an entire system including the robot controller used in the embodiment of the present invention will be described. In the figure, the robot controller generally indicated by 40 includes a microprocessor (hereinafter referred to as CPU) 41 as a central processing unit for controlling the entire system. The CPU 41 is connected via a bus line BL to a memory 42 in the form of ROM, a memory 43 in the form of RAM, a nonvolatile memory 44, a teaching operation panel 46 equipped with a liquid crystal display 45, a digital servo circuit 47 connected via a servo amplifier 48 to a welding robot mechanism RB, and a general-purpose interface 49 connected to the control section 20 (see FIG. 3) of the laser sensor LS as well as to a welding power supply section 30.

The ROM 42 stores various system programs to be executed by the CPU 41 for controlling the robot body 1, the laser sensor control section 20, the welding power supply section 30, and the robot controller 40 itself. The RAM 43 is a memory for temporary storage of data and for calculation. Buffers 1 and 2, mentioned later, are also set in this RAM 43. The nonvolatile memory 44 stores set values of various parameters and robot motion programs.

In the following, control procedure and processing for the fillet welding shown in FIG. 1 by the aforementioned system will be described referring to FIG. 6 and the subsequent figures.

Figure 6:
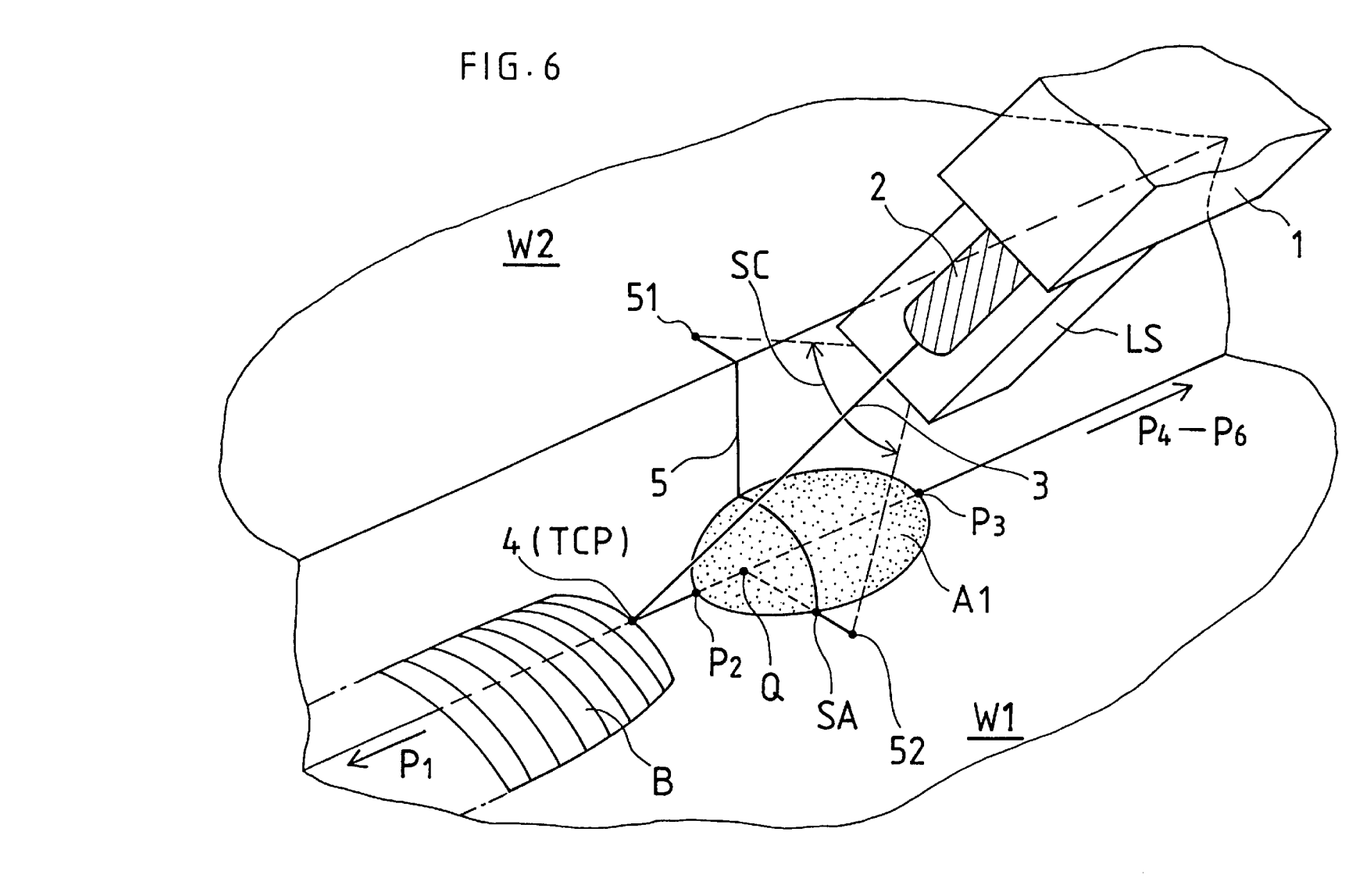
FIG. 6 is an enlarged perspective view showing a state in which a welding robot is approaching a tack welded portion A1 of the fillet weld joint shown in FIG. 1.

FIG. 6 is an enlarged perspective view showing a state in which the welding robot is approaching the tack welded portion A1 in the case shown in FIG. 1. For the sake of illustration, the distance between the robot hand and the distal end point of the tool (distal end of the welding wire) is shown exaggeratedly. Also in this figure, identical reference numerals are used to denote those elements shown in FIGS. 1 to 5.

As shown in FIG. 6, an arc welding torch 2 and the laser sensor LS are mounted on the hand 1 of the welding robot. A welding wire 3 is let out of the distal end of the torch 2 at a predetermined speed. The distal end point 4 of the tool is set so as to coincide with an aimed position of a distal end of the welding wire 3. The distal end point 4 is positioned at a front end of a formed bead B and immediately before the tack welded portion A1. Also, the distal end point 4 of the tool is located on the welding reference line ($P_1 \rightarrow P_2$ ... $\rightarrow P_6$; see FIG. 1) along the corner line formed between the overlapped workpieces. The point $P_2$ is a point at which the welding reference line meets a beginning end of the tack welded portion A1, and the point $P_3$ is a point at which the welding reference line meets a terminating end of the tack welded portion A1.

When the welding robot has advanced to the position as illustrated in this figure, the laser beam projected from the laser sensor LS with the deflection range SC forms a bright line 5 across the tack welded portion A1. Reference numerals 51 and 52 indicate opposite ends of the bright line 5. A point SA detected based on the bright line 5 is located at a point where the bright line 5 comes to cross the boundary between a lateral edge of the tack welded portion A1 and a surface of the workpiece W1, as explained with reference to FIGS. 2a and 2b.

Depending on the situation, however, the detected point SA may be shifted on the swollen surface of the tack welded portion A1 or the detected point SA can not be found (unable to detect). In any case, a point Q on the welding reference line that should be detected if the tack welded portion A1 were not present can scarcely be detected in practice.

Thus, if tracking control is performed in such a manner that a target point of movement of the TPC 4 of the robot is determined based on the detected point SA' as illustrated, this will cause the robot to make a movement so that the TCP 4 does not proceed from the point $P_2$ toward the point Q but toward the point SA. If the detected point SA is greatly deviated from the immediately preceding detected point, or if the detected point SA cannot be found, then the robot strays out of course or stops.

According to this embodiment, such problems are eliminated by making the TCP 4 of the robot proceed from the point $P_2$ toward the point Q, and then a target point of the TCP 4 is determined successively along the welding reference line while and after the robot passes the tack welded portion A1.

Figure 7:
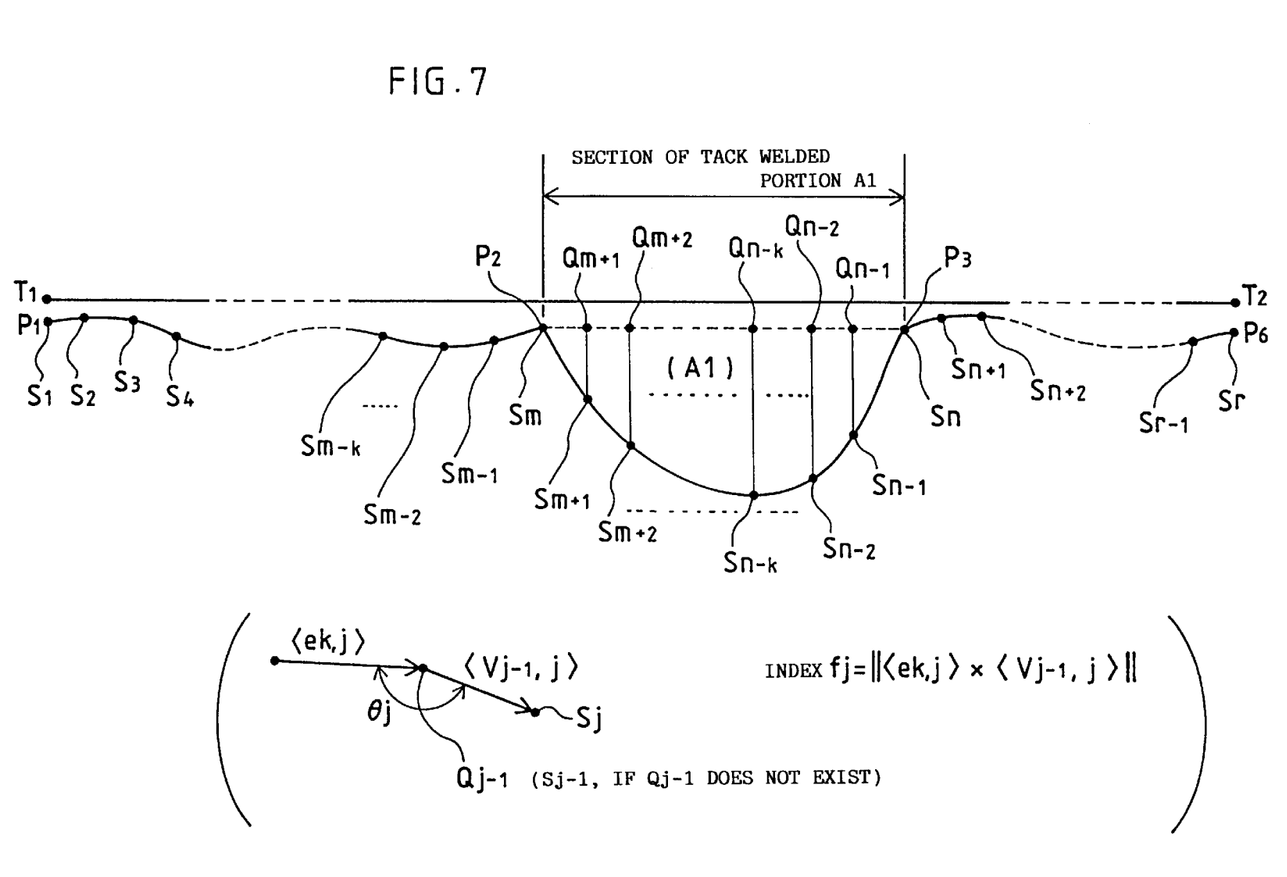
FIG. 7 is a diagram showing a way of determining a target point of movement of a tool center point (TCP) of the robot according to the embodiment.

FIG. 7 schematically illustrates how the target point for movement of the robot (TCP) is determined according to the embodiment, in which a relationship of a taught path extending across the tack welded portion A1, a welding reference line, a series of detected points and a series of target points of movement is shown with respect to the case shown in FIG. 6.

In FIG. 7, $T_1$ and $T_2$ are taught points specified by the position data in a robot motion program, and a straight line $T_1$–$T_2$ connecting these points constitutes a taught path. For an arcuate block, an arcuate path is defined by three taught points. Symbols $S_1, S_2, S_3, S_4, \ldots, S_{m-k}, \ldots, S_{m-2}, S_{m-1}, S_m, S_{m+1}, S_{m+2}, \ldots, S_{n-k}, \ldots, S_{n-2}, S_{n-1}, S_n, S_{n+1}, S_{n+2}, \ldots, S_{r-1}$, and $S_r$ represent a series of detected points detected by the laser sensor LS. The following description is based on the assumption that r is sufficiently greater than n and that n is sufficiently greater than m (i.e., the detection cycle is sufficiently short and the interval between adjacent detected points is also sufficiently small).

The first detected point $S_1$ and the last detected point $S_r$ corresponds to a start point $P_1$ and an end point $P_6$ of the welding reference line, respectively. The welding reference line along the corner line of the overlapped workpieces does not always coincide exactly with the taught path $T_1$–$T_2$ because of variation in the positioning of the workpieces, error in machining the workpieces, etc., and therefore, the series of detected points also more or less deviates or meanders, as illustrated, even in sections where no tack welded portion exists (in the figure, the meandering is somewhat exaggerated).

If the robot moves through the whole block under a tracking control based on the series of detected points $S_1, S_2, S_3, \ldots, S_{r-1}$ and $S_r$, as mentioned above, the movement path of the TCP of the robot almost coincides with the line connecting these detected points (however, if the detection is unable, the robot may possibly stray out of course or stops).

According to the present invention, therefore, if a detected point is greatly deviated from the welding reference line or the detection is unable, it is judged that a section including a tack welded portion is encountered, and a point to be substituted for such an improperly detected point (or when the detection is unable) is determined. In the block shown in FIG. 7, the points $S_{m+1}, S_{m+2}, \ldots, S_{n-k}, \ldots, S_{n-2}$ and $S_{n-1}$ are improper detected points, and symbols $Q_{m+1}, Q_{m+2}, \ldots, Q_{n-k}, \ldots, Q_{n-2}$ and $Q_{n-1}$ are proper points to be substituted for these improper detected points.

These points' determined when proper detected points are not obtained, are called herein "detection substitutive points". Also, the term "welding reference line representative points" is used for a combination of such detection substitutive points and the proper detected points such as $S_1$, $S_2, \ldots, S_m$. The "welding reference line representative point" represents the position of the welding reference line (the line extending along the original corner line). Thus, a line connecting a series of welding reference line representative points $S_1, S_2, \ldots, S_{m-1}, S_m, Q_{m+1}, Q_{m+2}, \ldots, Q_{n-2}, Q_{n-1}, Q_n, S_{n+1}, S_{n+2}, \ldots, S_{r-1}, S_r$ represents the welding reference line.

Therefore, if $Q_{m+1}, Q_{m+2}, \ldots, Q_{n-1}$ can be successively determined with respect to the tack welded portion A1 in advance of robot movement, with these points regarded as the welding reference line representative points which correspond to a series of the detected points $S_{m+1}, S_{m+2}, \ldots, S_{n-1}$ improperly representing the welding reference line, the target positions for movement of the robot are successively determined based on the welding reference line representative points, so that the robot is put on a path along the series of the welding reference line representative points.

According to the present invention, the processing for determining each welding reference line representative point when passing or when not passing a tack welded portion is divided into the following two stages:

(1) Stage of tack welded portion encountering/passing determination for determining whether or not the position of the detected point indicates that the welding line encounters or passes the tack welded portion.

(2) Stage of creating detection substitutive points which are expected to lie on the reference welding line, when the position of the detected point indicates the welding line encounters or passes the tack welded portion.

[Tack Welded Portion Encountering/passing Determination Stage]

This stage will be considered with respect to the following two cases:

First Case (Detection failure): This is a case where there is found no detected point. In this case, it is judged to be encountering a tack welded portion. However, this rule does not apply to the case where detection failure occurs in a section immediately after the start of welding where a tack welded portion cannot be considered present.

Second Case (Detection succeeded): This is a case where there is found a detected point. In this case, a deviation index value indicative of the amount of a sideways deviation from the welding reference line is calculated. Then, if the deviation index value is greater than a predetermined reference value, it is judged that a tack welded portion is being encountered. If the reference value is not exceeded by the deviation index value, it is judged that a tack welded portion is not being encountered (a tack welded portion is not yet encountered or has already been passed).

As the deviation index value, an index value representing the amount of deviation of a currently detected point from the robot path immediately before the detection of the point is appropriate. Such a robot path is supposed to lie on a series of the welding reference line representative points determined previously. Therefore, the immediately preceding robot path can be calculated based on the data of the welding reference line representative points immediately preceding the present data.

In this embodiment, therefore, an index value $f_j(j>k)$, which is shown in FIG. 7, is used. The deviation index value $f_j$ is defined by the following equation (3):

$$f_j = \|<ek, j> \times <vj-1, j>\| = |\sin \theta j| \cdot \|<vj-1, j>\| \qquad (3)$$

where $<ek, j>$ and $<vj-1, j>$ are vectors on a robot coordinate system and are defined as described below.

The vector $<ek, j>$ is a vector based on the data of near-past welding reference line representative points. That is, this vector is a unit vector (length: 1) indicating the direction of the robot path to be calculated based on k welding reference line representative points ($k \geq 2$) immediately preceding a detected point $S_j$, that is, $Q_{j-1}$, if $Q_{j-1}$ does not exist, and this is the case with the rest of the points mentioned below), $Q_{j-2}$ ($S_{j-2}$), ..., $Q_{j-k}$ ($S_{j-k}$). The vector can be calculated immediately by obtaining, by a least square method or the like, a straight line fitting the preceding k (in this example, "5") welding reference line representative points.

The vector $<vk, j>$ is a vector towards the detected point $S_j$ from the welding reference line representative point $Q_{j-1}$ ($S_{j-1}$, if $Q_{j-1}$ does not exist) immediately preceding the detected point $S_j$ (Note, this vector is not a unit vector).

The deviation index value $f_j$ defined as described above undergoes a qualitative change mentioned below. Here, it is assumed that k=5 (therefore, $f_1$ through $f_5$ are not calculated).

$f_6$ to $f_m$: Since no tack welded portion exists, a series of detected points along the welding reference line (true corner) is obtained. Accordingly, the deviation index value is relatively small.

$f_{m+1}$: As seen from FIG. 7, the detected point $S_{m+1}$ is a point on the edge of the tack welded portion A1 that is detected for the first time, and the deviation from the welding reference line is relatively large. Accordingly, the outer products of the vectors $<e5, m+1>$ and $<vm, m+1>$ also are relatively large. $f_{m+1}$ is calculated by the following equation:

$$f_{m+1} = \|<e5, m+1> \times <vm, m+1>\| \qquad (4)$$

The vectors $<e5, m+1>$ and $<vm, m+1>$ in this equation are calculated in accordance with the aforementioned definition, and the welding reference line representative points and detected points, which are the bases for calculating the two vectors, can be written as $<e5, m+1>$: Five welding reference line representative points $S_{m-4}, S_{m-3}, S_{m-2}, S_{m-1}, S_m \rightarrow$ five detected points (no detection substitutive points).

$<vm, m+1>$: Two detected points $S_m, S_{m+1}$.

$f_{m+2}$ to $f_{n-1}$: As seen from FIG. 7, the detected points $S_{m+2}$ through $S_{n-1}$ are a series of points along the edge of the tack welded portion A1, and thus the deviation from the welding reference line is relatively large at all of these points. Therefore, all the deviation index values calculated according to the respective equations indicated below are also relatively large. Especially, the $f_j$ that is calculated for a position where the protrusion of the tack bead is large naturally takes a large value. The following are the equations for calculating $f_{m+2}$ to $f_{n-1}$.

$$f_{m+2} = \|\langle e5, m+2\rangle \times \langle vm+1, m+2\rangle\| \quad (5)$$

$$f_{m+3} = \|\langle e5, m+3\rangle \times \langle vm+2, m+3\rangle\| \quad (6)$$

$$\vdots \quad \vdots \quad \vdots$$

$$f_{n-2} = \|\langle e5, n-2\rangle \times \langle vn-3, n-2\rangle\| \quad (7)$$

$$f_{n-1} = \|\langle e5, n-1\rangle \times \langle vn-2, n-1\rangle\| \quad (8)$$

The welding reference line representative points and detected points, the bases for calculating the vectors <ek, j> and <vj−1, j> in the above equations (4) to (8) are as follows:

<e5, m+2>: Five welding reference line representative points $S_{m-3}$, $S_{m-2}$, $S_{m-1}$, $S_m$, $Q_{m+1}$→four detected points+one detection substitutive point.

<e5, m+3>: Five welding reference line representative points $S_{m-2}$, $S_{m-1}$, $S_m$, $Q_{m+1}$, $Q_{m+2}$→three detected points+two detection substitutive points.

<e5, n−2>: Five welding reference line representative points $Q_{n-7}$, $Q_{n-6}$, $Q_{n-5}$, $Q_{n-4}$, $Q_{n-3}$→five detection substitutive points.

<e5, n−1>: Five welding reference line representative points $Q_{n-6}$, $Q_{n-5}$, $Q_{n-4}$, $Q_{n-3}$, $Q_{n-2}$→five detection substitutive points.

<vm+1, m+2>: Two detected points $S_{m+1}$, $S_{m+2}$.
<vm+2, m+3>: Two detected points $S_{m+2}$, $S_{m+3}$.
<vn−3, n−2>: Two detected points $S_{n-3}$, $S_{n-2}$.
<vn−2, n−1>: Two detected points $S_{n-2}$, $S_{n-1}$.

$f_n$: Since the detected point $S_n$ is a point where the tack welded portion A1 is passed, the deviation from the welding reference line is no longer large. Accordingly, the deviation index value calculated by the equation below is relatively small.

$$f_n = \|\langle e5, n\rangle \times \langle vn-1, n\rangle\| \quad (9)$$

$f_{n+1}$ to $f_r$: After passing the tack welded portion A1, the detected points do not largely deviate from the welding reference line until the next tack welded portion A2 (see FIG. 1) is encountered. From the beginning to the end of the next tack welded portion A2, the deviation index value undergoes a change similar to that described above with reference to the case of the encounter with and passage through the tack welded portion A1.

[Stage of Creating Detection substitutive point]

As will be understood from the foregoing explanation, in cases where the welding reference line representative points necessary for the calculation of the deviation index includes one or more detection substitutive points, it is necessary that the positions of the detection substitutive points be determined previously. One may be apprehensive that creating detection substitutive points based on the result of calculation of the deviation index value may lead to a circular argument. It should be noted, however, that this is not true.

In other words, the detection substitutive points according to the embodiment will be created successively from the point where the creation of a detection substitutive point has become necessary for the first time ($S_{m+1}$ in the example of FIG. 7). That is, the detection substitutive point $Q_{m+1}$ for the detected point $S_{m+1}$ is created based on the data of the past k welding reference line representative points, which do not include any detection substitutive point. The position of the detection substitutive point $Q_{m+1}$ is calculated as the position of a point where a straight line represented by the vector <e5, m+1> (straight line estimated to be extending along the corner) intersects a line extending perpendicularly from the detected point $S_{m+1}$.

Thereafter, in general, the position of a detection substitutive point $Q_i$ is calculated for a detected point $S_i$, when considered necessary to create a detection substitutive point, as the position of a point where the straight line represented by the vector <ek, i> intersects a line extending perpendicularly from the detected point $S_i$. Whether a detection substitutive point needs to be calculated or not is determined based on the deviation index $f_i$ which is based on the data of the detected points and detection substitutive points obtained until then. When detected point cannot be found, a detection substitutive point is obtained by extrapolating the straight line represented by the aforementioned vector <e5, m+1>, based on the detected points and/or detection substitutive points stored in the near past.

Figure 8:
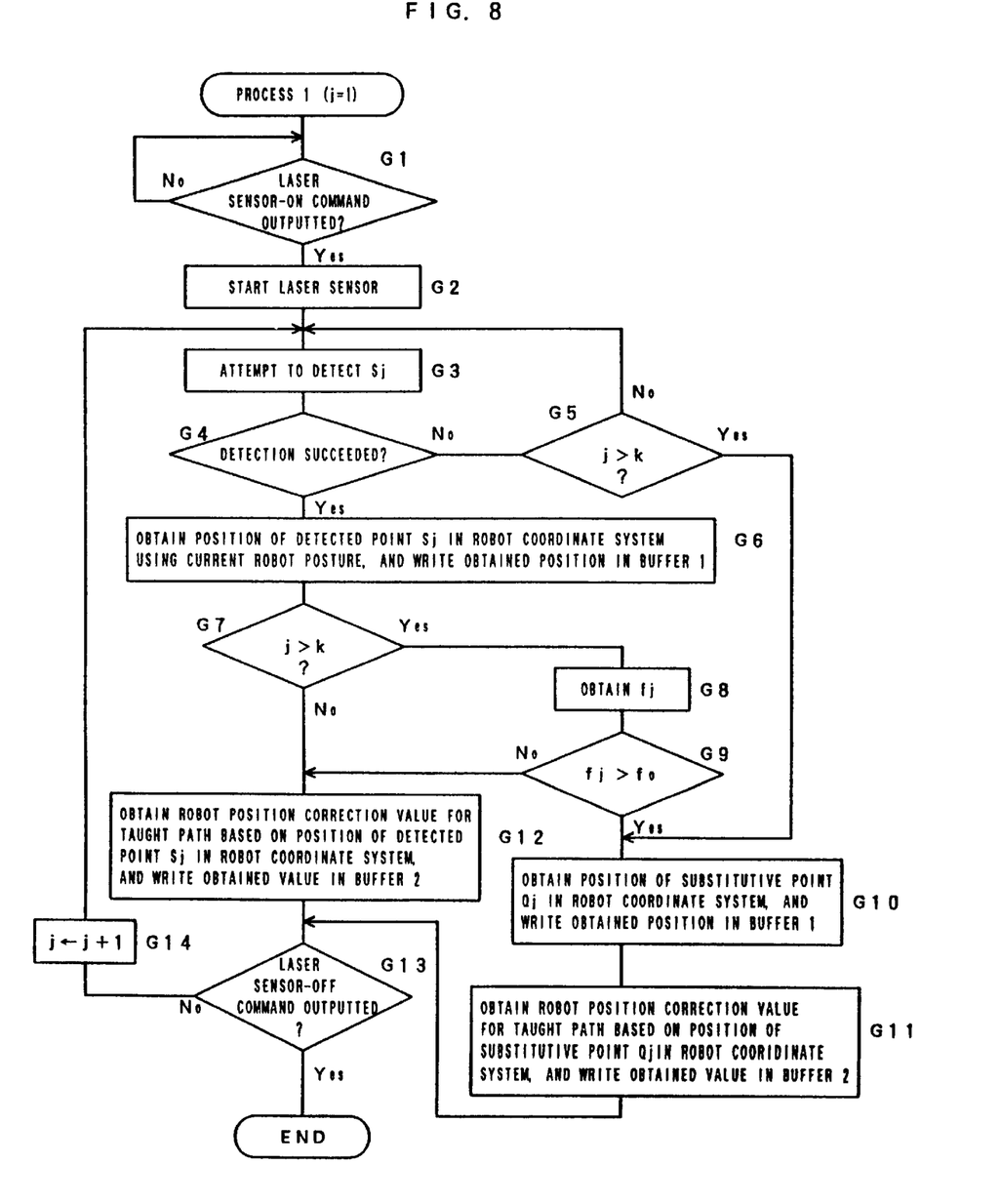
FIG. 8 is a flowchart showing an outline of a process for creating representative points for a welding reference line and creating robot position correction data based on the representative points.
Figure 9:
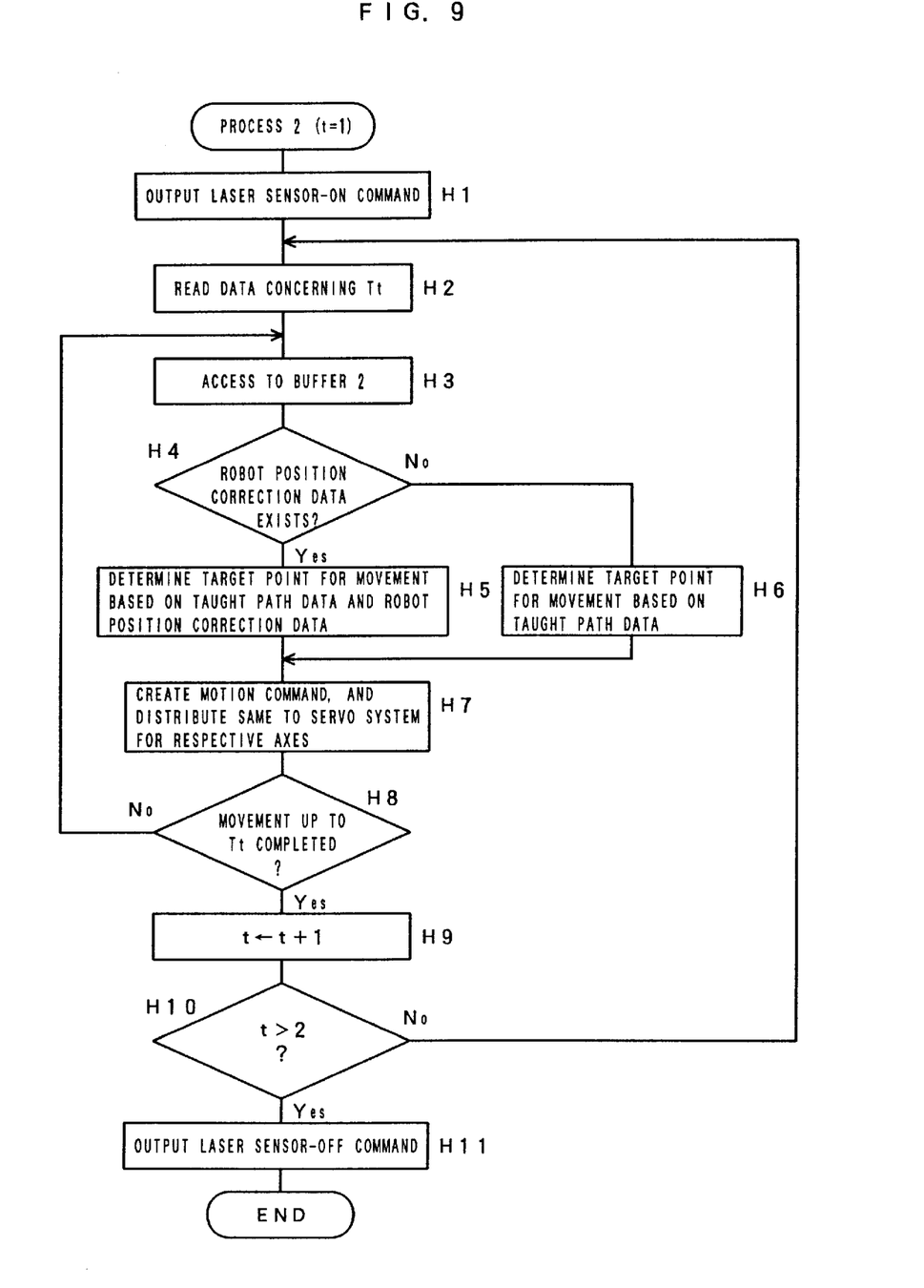
FIG. 9 is a flowchart showing an outline of a process for moving the robot using the data created by the process shown in FIG. 8.

FIGS. 8 and 9 are flowcharts schematically showing processes to be executed in the embodiment to obtain a movement path along a proper welding reference line (a line reckoned to be extending along the corner line and determined based on a series of welding reference line representative points $S_1$, $S_2$, ..., S, Q, Q, ..., Q, Q, S, S, ..., $S_{r-1}$ and $S_r$). The flowchart of FIG. 8 (processing 1) illustrates the process for creating a welding reference line representative point and the process for robot position correction data based on the obtained point, and the flowchart of FIG. 9 (processing 2) illustrates the process for moving the robot based on the data created in the process 1. The description of these processings is limited to those necessary in relation to the movement of the robot, and those relating to the on-off control of the welding torch and the control of the welding conditions are omitted.

The process 1 includes the following steps, wherein j is an index representing the number of times of detection is executed and its initial value is "1" (j=1).

[G1] When a laser sensor-on command is output (see processing 2), the procedure proceeds to Step G2.

[G2] The laser sensor is started.

[G3] Detection of a point $S_j$ is attempted.

[G4] If the detection of the point $S_j$ ends in failure, the procedure proceeds to Step G5, and if the detection ends in success, the procedure proceeds to Step G6.

[G5] If the index j is not greater than the set value k (in the aforementioned example, k=5, and this applies to the rest of cases), the procedure returns to Step G3 and detection of the point $S_j$ is attempted again. This is a process for coping with a natural situation that no detected point can be found unless the robot reaches a position immediately before the position P1.

When the index j is greater than the set value k, the procedure proceeds to Step G10 and the position of a detection substitutive point $Q_j$ (in the robot coordinate system) is calculated. That is, when detected point can not be found even after the robot reaches the position $P_1$ and starts fillet welding, it is judged that a tack welded portion has been encountered.

[G6] Using current robot orientation data, the position of the detected point $S_j$ in the robot coordinate system (spatial coordinate system set with reference to the robot) is obtained and written into the buffer 1. The buffer 1 stores data of the latest k welding reference line representative points in the form of table data.

[G7] When the index j is greater than the set value k, the procedure proceeds to Step G8, and the value of the aforementioned deviation index $f_j$ is calculated. If, however, the index j is smaller than k+1, the procedure proceeds to Step G12. This is because the deviation index $f_j$ will not (cannot) be calculated before a minimum of initial data necessary for the calculation of the aforementioned vector <ek, j> is stored.

[G8] The value of the aforementioned index $f_j$ is calculated. This calculation is made using the position data of detected points or detection substitutive points based on the robot coordinate system.

[G9] The thus-calculated value of the index $f_j$ is compared with a threshold $f_0$ which is set to a proper value, and if the former is greater than the latter, it is judged that a tack welded portion is encountered; therefore, the procedure proceeds to Step G10. If the threshold value is not exceeded, it is judged that no tack welded portion is encountered, and the procedure proceeds to Step G12.

[G10] The position of the detection substitutive point $Q_j$ is obtained on the robot coordinate system and written into the buffer 1.

[G11] A position correction value with respect to the taught path is obtained based on the position of the detection substitutive point $Q_j$ is obtained on the robot coordinate system and written into the buffer 2.

[G12] A position correction value with respect to the taught path is obtained based on the position of the detected point $S_j$ on the robot coordinate system and is written into the buffer 2.

[G13] A determination is made as to whether or not a laser sensor-off command has been output (see process 2). If a laser sensor-off command has been output, the laser sensor is turned off, and the procedure is terminated; otherwise the procedure proceeds to Step G14.

[G14] The index j is incremented by "1" and the procedure returns to Step G3.

The process 2 includes the following steps, wherein t represents a taught point index. In this example, the initial value and saturation value of the index t are "1" and "2", respectively.

[H1] A laser sensor-on command is output.

[H2] Program data relating to a taught point Tt is read.

[H3] The buffer 2 is accessed to retrieve data of the welding reference line representative points.

[H4] If there exists robot position correction data matching this very point of time (matching the degree of progress between the interval $P_1$–$P_2$), the correction data is read and the procedure proceeds to Step H5; otherwise, the procedure proceeds to Step H6. The laser sensor does not detect the corner formed between overlapped workpieces before the robot moving from its initial position reaches a welded portion of the workpieces, and thus robot position correction data will not be created. During this period of time, therefore, the procedure proceeds in the order of Step H4→Step H6→Step H7.

[H5] A target position for robot movement is determined based on taught path data and the robot position correction data.

[H6] A target position for robot movement is determined based on the taught path data.

[H7] A motion command is created and distributed to servos associated with respective axes.

[H8] If the processing for movement up to the taught point Tt has not yet been completed, the processing proceeds to Step H3, and, if the movement has been completed, the procedure proceeds to Step H9.

[H9] The taught point index value t is incremented by "1".

[H10] If the saturation value (in this example, "2") is not exceeded by the taught point index t, the procedure returns to Step H2, and if the saturation value is exceeded, the procedure proceeds to Step H11.

[H11] A laser sensor-off command is output to end the processing.

In the foregoing, an example of a welding of a corner extending nearly along a straight-line taught path is explained. However, it is apparent, that the present invention can also be applied to the case of butt-welding nearly along a straight-line taught path. In the case of butt welding, those points representing a gap between abutted portions (or a boundary of a joint) are detected by the laser sensor, and, when a tack welded portion exists, the edge on one side thereof is detected. In such a case, by treating the detected points and the edge as the detected point $S_j$ as explained above, process similar to those shown in the flowcharts of FIGS. 8 and 9 can be applied to determine a path extending along the welding reference line (path following the center line of the gap or the boundary of the joint) even when the passage across a tack welded portion is included.

Even in the case where the taught path is in the form of a circular arc, a path along the welding reference line can be obtained by modifying the method of determining the detection substitutive point, even when the passage across a tack welded portion is included, by the process similar to those shown in the flowcharts of FIGS. 8 and 9. In other words, where the taught path is of circular arc, the distance of separation between an arc $C_{k-j}$ predicted based on the past k points and a detected point $S_j$ corresponding thereto can be used as the index $f_j$ representing the magnitude of a deviation from the welding reference line. In this case, the detection substitutive point $Q_j$ may be set at a point where the circular arc $C_{k-j}$ intersects a line extending perpendicularly from the detected point $S_j$.

According to the present invention, even when a tack welded portion exists midway on the welding path, the arc welding robot can be moved nearly along the original welding reference line. Consequently, the realtime tracking function of the arc welding robot using the laser sensor improves, thereby contributing to an improvement of inefficiency and quality of the welding.

We claim:

1. A control system for controlling a welding robot for performing arc welding by moving a welding torch mounted on a robot hand along a welding reference line, said system comprising:

a laser sensor mounted on said robot hand, for repeatedly detecting a characteristic point of a joint shape of workpieces by scanning a region in an advancing directions of said welding robot with a laser beam;

properness determining means for determining whether the detected characteristic point is proper or improper as a point representing a position of said welding reference line, when the characterizing point is detected by said laser sensor;

first storing means for storing data representing the position of the detected point as data of a welding reference line representative point when the detected characteristic point is determined to be proper by said properness determining means;

detection substitutive point determining means for determining a detection substitutive point to be substituted for the detected characteristic point when it is determined that the detected characteristic point is improper by said properness determining means or when the characteristic point is not detected by said laser sensor;

second storing means for storing data representing a position of the detection substitutive point as data of the welding reference line representative point; and means for successively determining a target point of movement of said welding robot, based on the data of the welding reference line representative point stored in said first storing means and the data of the welding reference line representative point stored in said second storing means.

2. A welding robot control system according to claim 1, said properness determining means comprising:

means for obtaining a deviation index value which represents a magnitude of deviation of the detected characteristic point from the position of the welding reference line based on the data of the welding reference line representative points stored in near past in said first and second storing means and the data representing the position of the detected characteristic point; and means for comparing the deviation index value with a reference value.

3. A welding robot control system according to claim 1, said detection substitutive point determining means including means for determining said detection substitutive point on an extended line of a straight welding reference line represented by the data of the welding reference line representative points stored in near past, when a taught path extends in a straight line.

4. A welding robot control system according to claim 1, said detection substitutive point setting means including means for determining said detection substitutive point on an extended arcuate line of an arcuate welding reference line represented by the data of the welding reference line representative points stored in near past, when a taught path is of a circular arc.

5. A control system for controlling a welding robot for performing arc welding along a welding reference line, said system comprising:

a welding torch to weld along the welding reference line;

a memory storing a taught path for the robot to follow during motion;

a laser sensor to repeatedly detect points of a joint shape of a workpiece by scanning with a laser beam; and a control section to control motion of the welding torch by adding a detected point as a target point for movement of the welding reference line if the detected point is within a predetermined deviation index value and by adding a substitute point as a target point for movement of the welding reference line if the detected point is not within the predetermined reference value, wherein said control section uses a predetermined number of previous target points for the determination of the substitute point.

6. A control system for controlling a welding robot for performing arc welding along a welding reference line, said system comprising:

means for welding along the welding reference line;

means for storing a taught path for the robot to follow during motion;

means for repeatedly detecting points of a joint shape of a workpiece by scanning with a laser beam; and means for controlling motion of the welding torch by adding a detected point as a target point for movement of the welding reference line if the detected point is within a predetermined deviation index value and by adding a substitute point as a target point for movement of the welding reference line if the detected point is not within the predetermined reference value, wherein said motion controlling means uses a predetermined number of previous target points for the determination of the substitute point.

* * * * *

UNITED STATES PATENT AND TRADEMARK OFFICE
CERTIFICATE OF CORRECTION

PATENT NO.: 6,040,554
DATED    :    March 21, 2000
INVENTOR(S):  Akihiro TERADA, et al.

It is certified that errors appear in the above-identified patent and that said Letters Patent is hereby corrected as shown below:

Title Page - Item 75 change "Oshino-mura to --Minamitsuru--
   Column 2 - line 5 change "2-$P_3$ " to --$P_2$-$P_3$--
   Column 6 - line 16 change "SA'" to --SA,--
   Column 7 - line 9 change "points' to --points,--
   Column 8 - line 19 insert --(Sj-1-- before ", if"
   Column 9 - line 9 in equations 5, 6, 7 and 8 - change "⟨" to --<--; change "⟩" to -->--, all occurrences
   Column 9 - line 15 change "$S_m$-3" to --$S_{m-3}$--

Signed and Sealed this

Thirteenth Day of February, 2001

*Attest:*

NICHOLAS P. GODICI

*Attesting Officer*      *Acting Director of the United States Patent and Trademark Office*